United States Patent
Burger

(10) Patent No.: US 12,036,918 B2
(45) Date of Patent: Jul. 16, 2024

(54) SYSTEM AND METHOD FOR OPERATING BEACON LIGHTS IN MACHINES

(71) Applicant: Caterpillar Paving Products Inc., Brooklyn Park, MN (US)

(72) Inventor: Tyler Scott Burger, Plymouth, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 179 days.

(21) Appl. No.: 17/656,893

(22) Filed: Mar. 29, 2022

(65) Prior Publication Data

US 2023/0311750 A1    Oct. 5, 2023

(51) Int. Cl.
   *B60Q 1/52*    (2006.01)
   *G08B 5/36*    (2006.01)

(52) U.S. Cl.
   CPC ................ *B60Q 1/52* (2013.01); *G08B 5/36* (2013.01); *B60Y 2200/413* (2013.01)

(58) Field of Classification Search
   None
   See application file for complete search history.

(56) References Cited

U.S. PATENT DOCUMENTS

| | | | |
|---|---|---|---|
| 6,023,221 A | 2/2000 | Michelotti | |
| 6,229,438 B1 | 5/2001 | Kutlucinar et al. | |
| 9,802,533 B2 | 10/2017 | Ruffner et al. | |
| 10,654,409 B2 | 5/2020 | Nagata | |
| 2005/0007246 A1 | 1/2005 | Yen et al. | |
| 2016/0243982 A1* | 8/2016 | Ruffner ................ | B60Q 1/2611 |

FOREIGN PATENT DOCUMENTS

| | | |
|---|---|---|
| FR | 2724612 A1 | 3/1996 |
| WO | 2008156383 A1 | 12/2008 |

* cited by examiner

*Primary Examiner* — John F Mortell

(57) ABSTRACT

A method for operating a beacon light of a machine is described. The method includes activating, by a processing unit, the beacon light based on a signal to indicate an operational state of the machine. The signal corresponds to one or more machine parameters in the operational state of the machine.

18 Claims, 6 Drawing Sheets

SYSTEM AND METHOD FOR OPERATING BEACON LIGHTS IN MACHINES

TECHNICAL FIELD

The present disclosure relates, in general, to indicators, such as beacon lights provided on a machine. More particularly, the present disclosure relates to a method for operating a beacon light.

BACKGROUND

Work machines, such as compactors, generally include indicators, such as beacon lights. Beacon lights generally provide rotating or flashing lights in order to notify others (e.g., personnel or other machines) in the vicinity of the machine of the presence of the machine and/or of a work being performed by the machine. A beacon light is usually operated (i.e., activated and/or deactivated) manually by an operator of the machine generally using physical or virtual switches provided on the machine.

U.S. Pat. No. 6,229,438 relates to an apparatus and method to warn drivers of a hazardous condition experienced by another driver. The apparatus includes a warning indicator coupled to a vehicle warning controller. The vehicle warning controller is connected between a power source and a plurality of vehicle detecting circuits which detect the activation of a safety device. When at least one of the vehicle detecting circuits detects the activation of a safety device due to a hazardous condition, a signal is sent to the vehicle warning controller. The warning indicator is activated in response to a signal from the vehicle warning controller.

SUMMARY OF THE INVENTION

In one aspect, the disclosure relates to a method for operating a beacon light of a machine. The method includes activating, by a processing unit, the beacon light based on a signal to indicate an operational state of the machine. The signal corresponds to one or more machine parameters in the operational state of the machine.

In another aspect, the disclosure is directed to a machine. The machine includes a beacon light and a system for operating the beacon light. The system includes a processing unit configured to activate the beacon light based on a signal to indicate an operational state of the machine. The signal corresponds to one or more machine parameters in the operational state of the machine.

DETAILED DESCRIPTION

Reference will now be made in detail to specific embodiments or features, examples of which are illustrated in the accompanying drawings. Wherever possible, the same reference numbers will be used throughout the drawings to refer to the same or the like parts.

Figure 1:
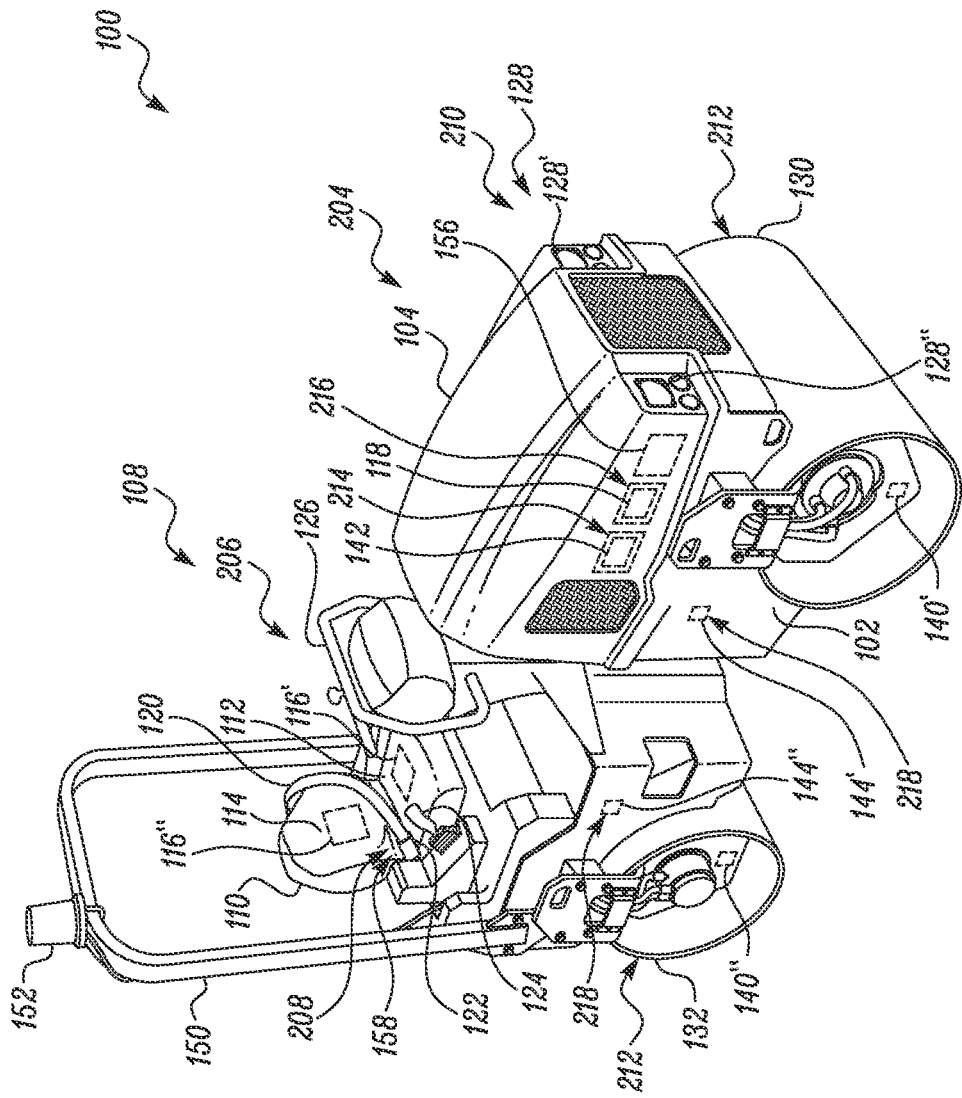
FIG. 1 is an exemplary machine, according to an embodiment of the present disclosure.

Referring to FIG. 1, an exemplary machine 100 is illustrated. The machine 100 may be one of various types of machinery used in a number of industries such as mining, agriculture, construction, transportation, forestry, waste management, and material handling, among others. For example, the machine 100 may be a construction machine, such as a compactor which may include one or more compactor drums 130, 132 that may push down and compact an underlying a compactable substrate when forming or refurbishing a roadway. It should be noted that the machine 100 may include or represent any other machine including, but not limited to, an off-highway haul truck, a loader, a motor grader, an excavator, a fork-lift, or any other earth moving machine, mining machine, or construction machine, with one or more aspects of the present disclosure being suitably applicable to any such machine.

The machine 100 includes a frame 102. The frame 102 is configured to support and/or mount one or more components or sub-systems of the machine 100. For example, the machine 100 includes an indicator 152. The indicator 152 may include a visual indicator in the form of a beacon light or strobe light, an activation of which may indicate an operational state of the machine 100. The indicator 152 may be coupled to a beam extending (e.g., integrally) from the frame 102. The mounting of the indicator 152 to the beam is exemplary. In some embodiments, the indicator 152 may be a part of a roll-over protecting structure (ROPS) 150 of the machine 100. The indicator 152 may be mounted to any outer surface portion of the machine 100 from where the indicator 152 may remain easily visible to one or more personnel around the machine 100.

The machine 100 may also include other sub-systems. For example, the machine 100 may include a power source system 204, a seating system 206, a seat belt locking system 208, a light system 210, an implement system 212, a machine speed sensing system 214, a location detection system 216, and a proximity detection system 218.

The power source system 204 may include an enclosure 104. The enclosure 104 may house the power source system 204. The power source system 204 includes one or more power sources (e.g., power source 156) configured to provide power to the machine 100 for operational and mobility requirements of the machine 100. The power source 156 may include an internal combustion engine such as one which may be powered by combusting a fuel such as, but not limited to, gasoline, diesel, natural gas, or a similar fuel, or any combination thereof. In some embodiments, the power source 156 may include electrical power storage devices like batteries, an electric motor, and on the like, that may be applied either alone or in combination with the internal combustion engine.

Figure 2:
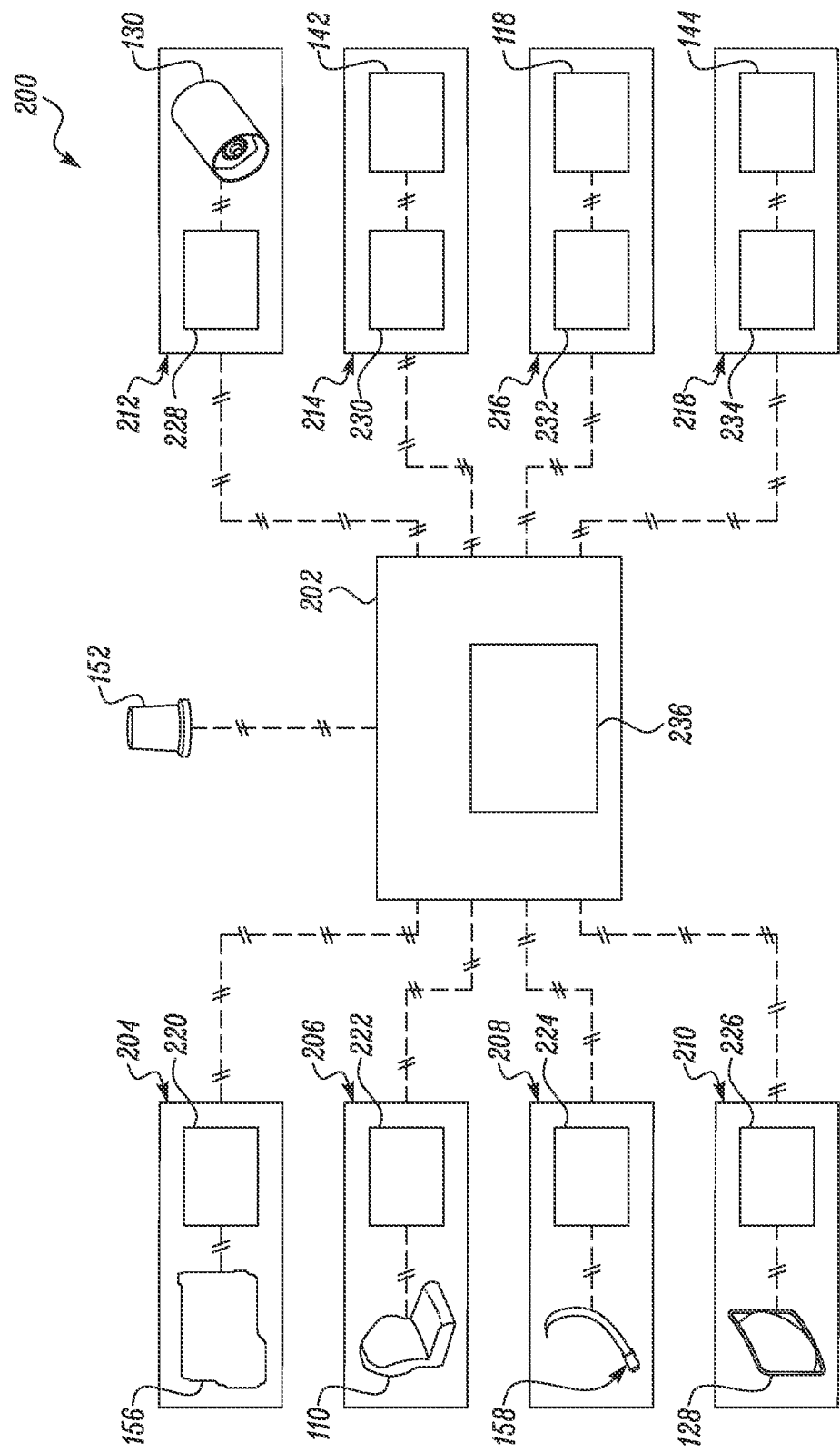
FIG. 2 is a diagrammatic view of a system for operating a beacon light, according to an embodiment of the present disclosure.

In an embodiment, shown in FIG. 2, the power source system 204 may include a power source controller 220 coupled to the power source 156. For example, the power source controller 220 can be the machine's ECM (i.e., an Electronic Control Module), an alternator, or any other similar module. The power source controller 220 is configured to determine a running state of the power source 156. In accordance with various embodiments, the running state may correspond to one or both of a functional condition (e.g., an ON condition) and a non-functional condition (e.g., an OFF condition) of the internal combustion engine and/or of the power storage device(s).

To this end, the power source controller 220 may be configured to receive a signal indicative of the running state of the power source 156 of the machine 100. In some embodiments, the signal may be received from one or more components, such as, transducers or sensors associated with detecting one or more parameters of the power source 156. As an example, the parameters may include, but not limited to, one or more of a fueling rate, an exhaust flow rate, an output shaft speed, an exhaust gas temperature, and the like, associated with the power source when the internal combustion engine is applied as the power source. As an example, the parameters may include, but not limited to, a rate of discharge of electrical power, an output shaft speed, and the like, associated with the power source, when the electrical power storage device is applied as the power source In some embodiments, the power source controller 220 may be configured to compare the running state of the power source 156 with a predefined running state and generate a signal based on the comparison. For example, the power source controller 220 is configured to generate the signal (e.g., a first signal) when the running state of the power source 156 of the machine 100 corresponds to the predefined running state. Further, the power source controller 220 is configured to generate another signal (e.g., a second signal) when the running state of the power source 156 of the machine 100 deviates from the predefined running state.

The predefined running state may correspond to the ON state of the power source 156 and a deviation of the running state from the predefined running state may correspond to the OFF state of the power source 156. As an example, when the output shaft speed is equal to or above a threshold, it would correspond to the condition where the running state corresponds to the predefined running state and when the shaft output speed is lesser than the threshold, it would correspond to the deviation. The power source controller 220 is further configured to transmit the generated signal (i.e., the first signal or the second signal) to a processing unit 202 (as shown in FIG. 2) of the machine 100.

The seating system 206 may include an operator station 108 provided on the frame 102. The operator station 108 may house the seating system 206. The seating system 206 includes one or more operator seats (e.g., operator seat 110) secured on a floor of the operator station 108. The operator seat 110 may include a seat base 112 and a seat back 114 extending from the seat base 112 configured to enable an operator to be seated on the seat base 112 while resting his back on the seat back 114 of the operator seat 110.

As shown in FIG. 2, the seating system 206 further includes a seating controller 222 coupled to the operator seat 110. The seating controller 222 is configured to determine a state of the operator seat 110 of the machine 100. In accordance with various embodiments, the state of operator seat 110 may correspond to one or both of an occupied state (e.g., when an operator is seated on the operator seat 110) and an unoccupied state (e.g., when the operator is not seated on the operator seat 110).

To this end, the seating controller 222 may be configured to receive a signal indicative of the state of the operator seat 110 of the machine 100. As an example, the signal may be received from one or more sensors 116 (e.g., sensor 116' in the seat base 112 and/or sensor 116" in the seat back 114). The sensor 116 may include, but not limited to, a pressure sensor, a weight sensor, a temperature sensor, or any other suitable means, associated with detecting one or more parameters of the operator seat 110. For example, the pressure sensor may include strain gauges configured to provide strain voltages or strain values. As an example, the parameters may include, but not limited to, one or more of a pressure exerted on the seat base 112 and/or the seat back 114 of the operator seat 110 when the sensor 116 is the pressure sensor, weight exerted on the seat base 112 and/or the seat back 114 of the operator seat 110 when the sensor 116 is the weight sensor, temperature associated with the seat base 112 and/or the seat back 114 of the operator seat 110 when the sensor 116 is the temperature sensor. In some other embodiments, the signal may be received from one or more components (not shown), such as, a relay, a timer, or any electromechanical device associated with detecting the state of the operator seat 110 of the machine 100.

In some embodiments, the seating controller 222 may be configured to compare the received signal with a corresponding predefined value and generate a signal based on the comparison. For example, the seating controller 222 is configured to generate the signal (e.g., the first signal) when value of the received signal is greater than or equal to the corresponding predefined value. Further, the seating controller 222 is configured to generate the signal (e.g., the second signal) when the value of the received signal is less than the corresponding predefined value.

In accordance with various embodiments, the predefined value may correspond to a minimum value (e.g., a minimum pressure value, a minimum weight value, or a minimum temperature value) detected by the one or more sensors 116 when the operator is seated on the operator seat 110. As an example, when the pressure exerted on the operator seat 110 is greater than or equal to a predefined value (e.g., a predefined pressure value), the seating controller 222 is configured to generate the first signal and when the pressure exerted on the operator seat 110 is less than the predefined value, the seating controller 222 is configured to generate the second signal. The seating controller 222 is further configured to transmit the generated signal (i.e., the first signal or the second signal) to the processing unit 202 (as shown in FIG. 2) of the machine 100.

The seat belt locking system 208 may include a seat belt assembly 158 configured to secure the operator in the operator seat 110. The seat belt assembly 158 may house the seat belt locking system 208. The seat belt assembly 158 includes a seat belt 120 with a tongue (not shown) disposed on the seat belt 120 and a seatbelt buckle assembly 122 configured to receive the tongue and secure the seat belt 120. A seat belt assembly 158 may be provided with the operator seat 110.

As shown in FIG. 2, the seat belt locking system 208 further includes a seat belt controller 224 coupled to the seat belt assembly 158. The seat belt controller 224 is configured to detect a state of the seat belt 120 of the seat belt assembly 158. In accordance with various embodiments, the state of the seat belt 120 may correspond to one or both of a locked state (e.g., when the tongue of the seat belt 120 is inserted in the seatbelt buckle assembly 122) and an unlocked state (e.g., when the tongue of the seat belt 120 is not inserted in the seatbelt buckle assembly 122).

To this end, the seat belt controller 224 may be configured to receive a seat belt connection signal indicative of the state of the seat belt 120. As an example, the signal may be received from the machine's ECM or any other similar module. In some embodiments, the seat belt connection signal may be received from one or more components (not shown), such as, a sensor, a switch, a relay, a timer, or any electromechanical device associated with detecting connection and engagement of the tongue of the seat belt 120 with the seatbelt buckle assembly 122. The seat belt controller 224 may be further configured to generate the signal (e.g., the first signal) when the state of the seat belt 120 corresponds to the locked state. Further, the seat belt controller 224 may be configured to generate the signal (e.g., the second signal) when the state of the seat belt 120 corresponds to the unlocked state. The seat belt controller 224 may be further configured to transmit the generated signal (i.e., the first signal or the second signal) to the processing unit 202 (as shown in FIG. 2) of the machine 100.

The light system 210 may include one or more light sources 128 installed on the machine 100. The light source 128 may house the light system 210. For example, the one or more light sources 128 may include head lights (128', 128") or parking lights arranged on a front end of the enclosure 104 for improved visibility. In some embodiments, the light source 128 may include one or more light sources provided in the operator station 108 to assist the operator in viewing control devices, such as a lever 124 and an operator interface 126.

As shown in FIG. 2, the light system 210 further includes a light controller 226 coupled to the light source 128. The light controller 226 is configured to detect a state of the light source 128. In accordance with various embodiments, the state of the light source 128 may correspond to one or both of an active state (e.g., ON state) and an inactive state (e.g., OFF state).

To this end, the light controller 226 may be configured to receive a signal indicative of the state of the light source 128. As an example, the signal may be received from the machine's ECM or any other similar module. In some embodiments, the signal may be received from one or more components, such as, sensors (e.g., light sensor), a relay, a timer, or any electromechanical device associated with detecting one or more parameters, such as light intensity and the like of the light source 128.

The light controller 226 may be further configured to generate the signal (e.g., the first signal) when the state of the light source 128 corresponds to the active state. Further, the light controller 226 may be further configured to generate the signal (e.g., the second signal) when the state of the light source 128 corresponds to the inactive state. As an example, when the light intensity is equal to or above a threshold, it would correspond to the condition where the state of the light source corresponds to the active state and when the light intensity is less than the threshold, it would correspond to the condition where the state of the light source corresponds to the inactive state. The light controller 226 is further configured to transmit the generated signal (i.e., the first signal or the second signal) to the processing unit 202 (as shown in FIG. 2) of the machine 100.

The implement system 212 may include one or more implements (e.g., the front compactor drum 130 and/or the rear compactor drum 132). The implements 130, 132 may house the implement system 212. In accordance with various embodiments, the implements 130, 132 are configured to provide compaction on the ground surface, while also providing mobility to the machine 100 as per operational requirements. In some embodiments, the implements 130, 132 also include vibratory mechanism to provide vibrations during compaction. Although FIG. 1 shows the implements as the front compactor drum 130 and/or the rear compactor drum 132, it may be contemplated that in other embodiments of the present disclosure, the implements may include other types of implements, such as, but not limited to, bucket, ejector body, blades, scrapers, grapples, or the like employed by the machine 100.

As shown in FIG. 2, the implement system 212 further includes an implement controller 228 coupled to the one or more implements 130, 132. The implement controller 228 is configured to detect a state of the one or more implements 130, 132 of the machine 100. In accordance with various embodiments, the state may correspond to one or both of a functional condition (e.g., operating or movable condition) and a non-functional condition (e.g., non-operating or stationary condition) of the one or more implements 130, 132.

To this end, the implement controller 228 may be configured to receive a signal indicative of the state of the one or more implements 130, 132. As an example, the signal may be received from the machine's ECM or any other similar module. In some embodiments, the signal may be received from one or more sensors 140 (e.g., sensor 140' installed on the front compactor drum 130, sensor 140" installed on the rear compactor drum 132), a relay, a timer, or any electromechanical device associated with detecting the state of the one or more implements 130, 132. The sensor 140 may include, but not limited to, accelerometer, associated with detecting one or more parameters of the one or more implements 130, 132. As an example, the parameters may include, but not limited to, one or more of acceleration value, vibration value, and the like of the one or more implements 130, 132. In some embodiments, the sensor 140 may be configured to detect a fluid pressure in one or more hydraulic circuits associated with a working of one or more of the implements 130, 132.

In some embodiments, the implement controller 228 may be configured to compare the state of the one or more implements 130, 132 with a predefined implement state and generate a signal based on the comparison. For example, the implement controller 228 is configured to the signal (e.g., the first signal) when the state of the one or more implements 130, 132 corresponds to the predefined implement state. Further, the implement controller 228 is configured to generate another signal (e.g., the second signal) when the state of the one or more implements 130, 132 deviates from the predefined implement state.

The predefined implement state may correspond to the operating or movable condition of the one or more implements 130, 132 and a deviation of the implement state from the predefined implement state may correspond to the non-operating or stationary condition of the one or more implements 130, 132. As an example, when the acceleration value is equal to or above a threshold, it would correspond to the condition where the state corresponds to the predefined implement state and when the acceleration value is lesser than the threshold, it would correspond to the deviation. Further, in some embodiments, when the fluid pressure is higher than a threshold, it would correspond to the condition where the state corresponds to the predefined implement state and when the fluid pressure is higher than the threshold, it would correspond to the deviation. The implement controller 228 is further configured to transmit the generated signal (i.e., the first signal or the second signal) to a processing unit 202 (as shown in FIG. 2) of the machine 100.

The machine speed sensing system 214 may be housed on the frame 102 and/or in the enclosure 104 of the machine 100. The machine speed sensing system 214 includes one or more sensors 142 configured to detect state of motion (e.g., machine speed) of the machine 100. The one or more sensors 142 may include, but not limited to, a position sensor (e.g., Global Positioning Sensor), an accelerometer, and the like for detecting the state of motion of the machine 100. As an example, the position sensor is configured to use location associated with the machine 100 to determine a distance travelled by the machine 100 and the time taken to travel such distance and further determine the state of motion (e.g., the machine speed) based on the determined distance and the time. When the sensor 142 is the accelerometer, the acceleration values represent the state of motion (e.g., the machine speed) of the machine 100. In accordance with various embodiments, the state of motion may correspond to one or both of a moving state (e.g., when the machine 100 is moving with the machine speed greater than equal to a predefined speed value) and a stationary state (e.g., when the machine is not moving or moving with the machine speed less than the predefined speed value).

As shown in FIG. 2, the machine speed sensing system 214 further includes a machine speed sensing controller 230 coupled to the one or more sensors 142. The machine speed sensing controller 230 may be configured to compare the state of the motion (e.g., the machine speed) of the machine 100 with the predefined speed value and generate a signal based on the comparison. For example, the machine speed sensing controller 230 is configured to generate the signal (e.g., the first signal) when the state of the motion of the machine is greater than or equal to the predefined speed value. Alternatively, the machine speed sensing controller 230 is configured to generate the signal (e.g., the second signal) when the state of the motion of the machine is less than the predefined speed value.

In accordance with various embodiments, the predefined speed value may represent a speed value of the machine 100 at or beyond which the machine 100 is determined to be in the moving state with respect to the ground surface. The machine speed sensing controller 230 is further configured to transmit the generated signal (i.e., the first signal or the second signal) to the processing unit 202 (as shown in FIG. 2) of the machine 100.

The location detection system 216 may be housed on the frame 102 or in the enclosure 104 of the machine 100. The location detection system 216 includes one or more sensors 118, such as the position sensors, configured to detect a location of the machine 100. In an exemplary embodiment of the present disclosure, the position sensor is the Global Positioning System (GPS) configured to detect the location (e.g., location coordinates) associated with the machine 100. Alternatively, the one or more sensors may include an Inertial Reference Unit (IRU), a component of a local tracking system, or any other known locating device that receives or determines location associated with the machine 100.

As shown in FIG. 2, the location detection system 216 further includes a location detection controller 232 coupled to the sensor 118 in the location detection system 216. The location detection controller 232 may be configured to compare the location with a predefined zone or a predefined location range and generate a signal based on the comparison. As an example, the location detection controller 232 is configured to generate the signal (e.g., the first signal) when the location of the machine 100 falls within the predefined location range. Further, the location detection controller 232 is configured to generate the signal (e.g., the second signal) when the location of the machine 100 falls outside the predefined location range.

Figure 3A:
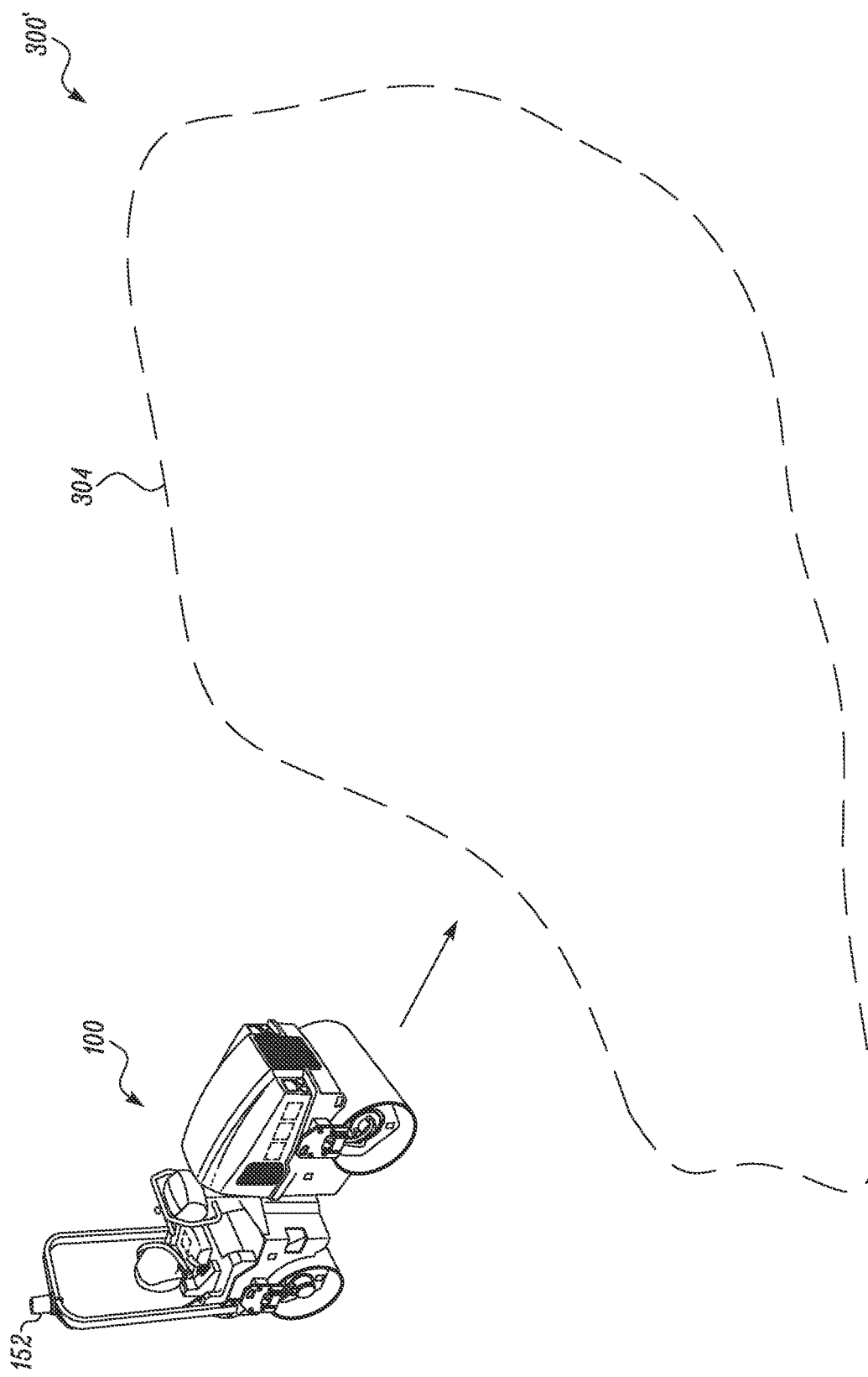
FIGS. 3A and 3B and 4A and 4B illustrate exemplary environments for operating the beacon light, according to an embodiment of the present disclosure.
Figure 3B:
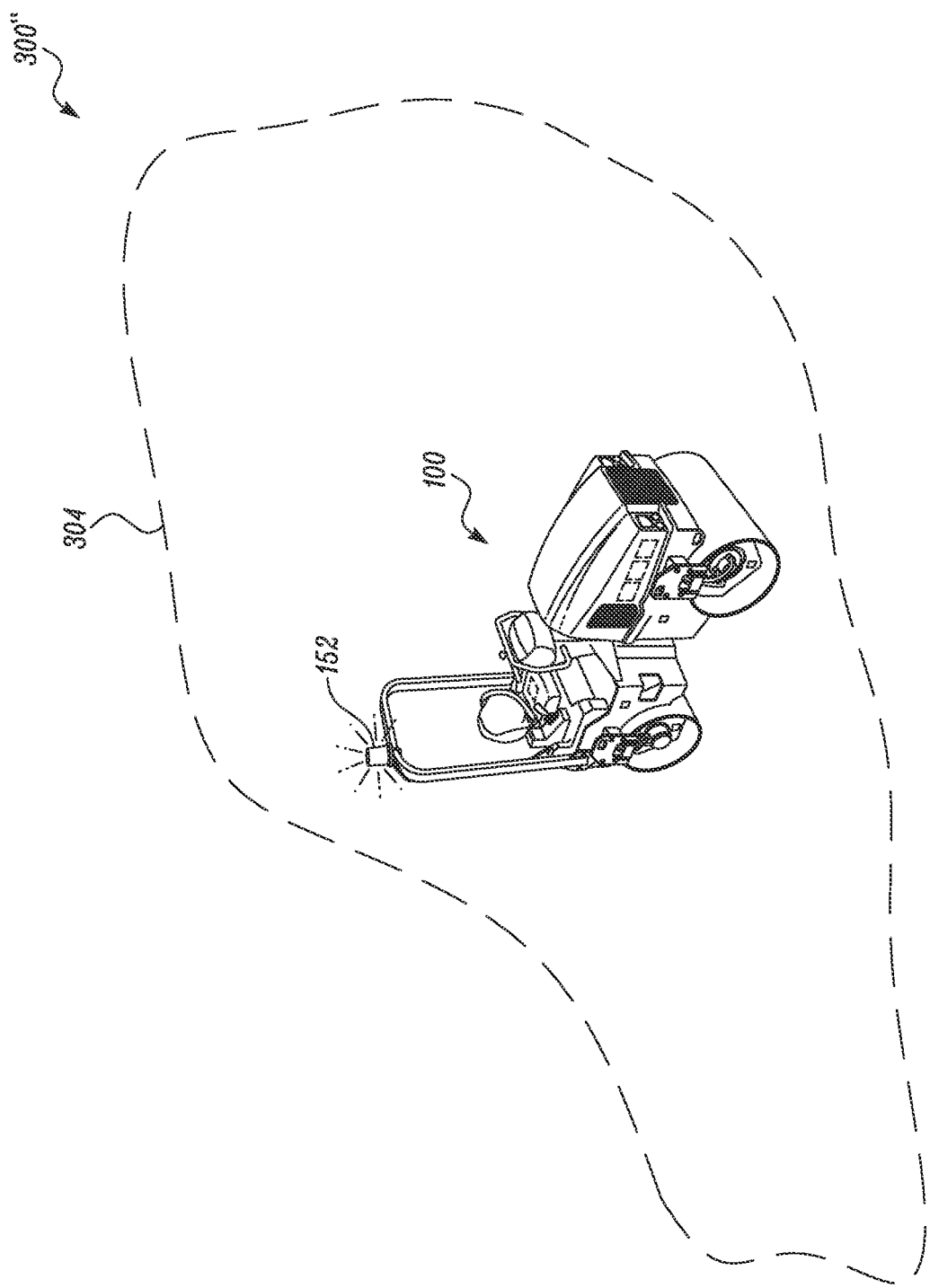

In accordance with various embodiments, the predefined location range corresponds to location coordinates of a portion of a worksite in which the movement of the machine 100 is expected. For example, as shown in FIGS. 3A and 3B, the portion 304 of the worksites 300', 300" corresponds to the predefined location range in which the movement of the machine 100 is expected. To this end, when the determined location coordinates of the machine 100 correspond to the location coordinates of the portion 304 of the worksite 300" as shown in FIG. 3B, it would correspond to the condition where the location of the machine 100 falls within the predefined location range. Further, when the determined location coordinates of the machine 100 do not correspond to the location coordinates of the portion 304 of the worksite 300' as shown in FIG. 3A, it would correspond to the condition where the location of the machine 100 falls outside the predefined location range. The location detection controller 232 is further configured to transmit the signal (for example, the first signal or the second signal) to the processing unit 202 of the machine 100.

The proximity detection system 218 may be housed on the frame 102 of the machine 100. The proximity detection system 218 includes one or more sensors 144 (e.g., sensors 144' and 144") configured to detect the proximity of an entity (for example, an object, personnel, or a machine) from the machine 100. The sensor 144 may include, but not limited to, proximity sensor. The sensors 144 are disposed at one or more locations about the machine 100.

As shown in FIG. 2, the proximity detection system 218 further includes a proximity detection controller 234 coupled to the sensors 144. The proximity detection system 218 may be configured to compare the proximity of the entity from the machine 100 with a predefined distance range and generate a signal based on the comparison. As an example, the proximity detection controller 234 is configured to generate the signal (e.g., the first signal) when the proximity of the entity from the machine 100 falls within the predefined distance range. Further, the proximity detection controller 234 is configured to generate the signal (e.g., the second signal) when the proximity of the entity from the machine 100 falls outside the predefined distance range.

Figure 4A:
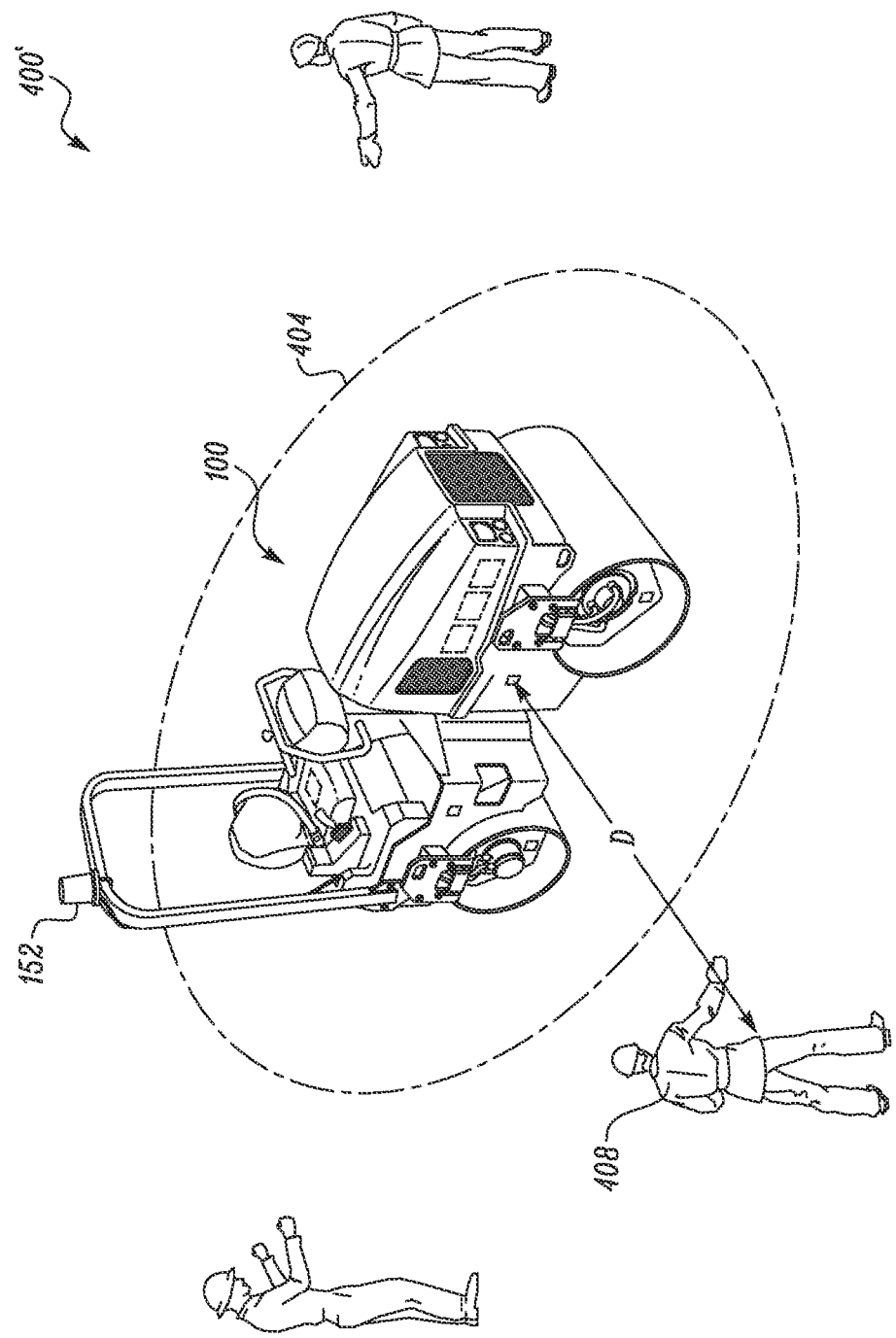
Figure 4B:
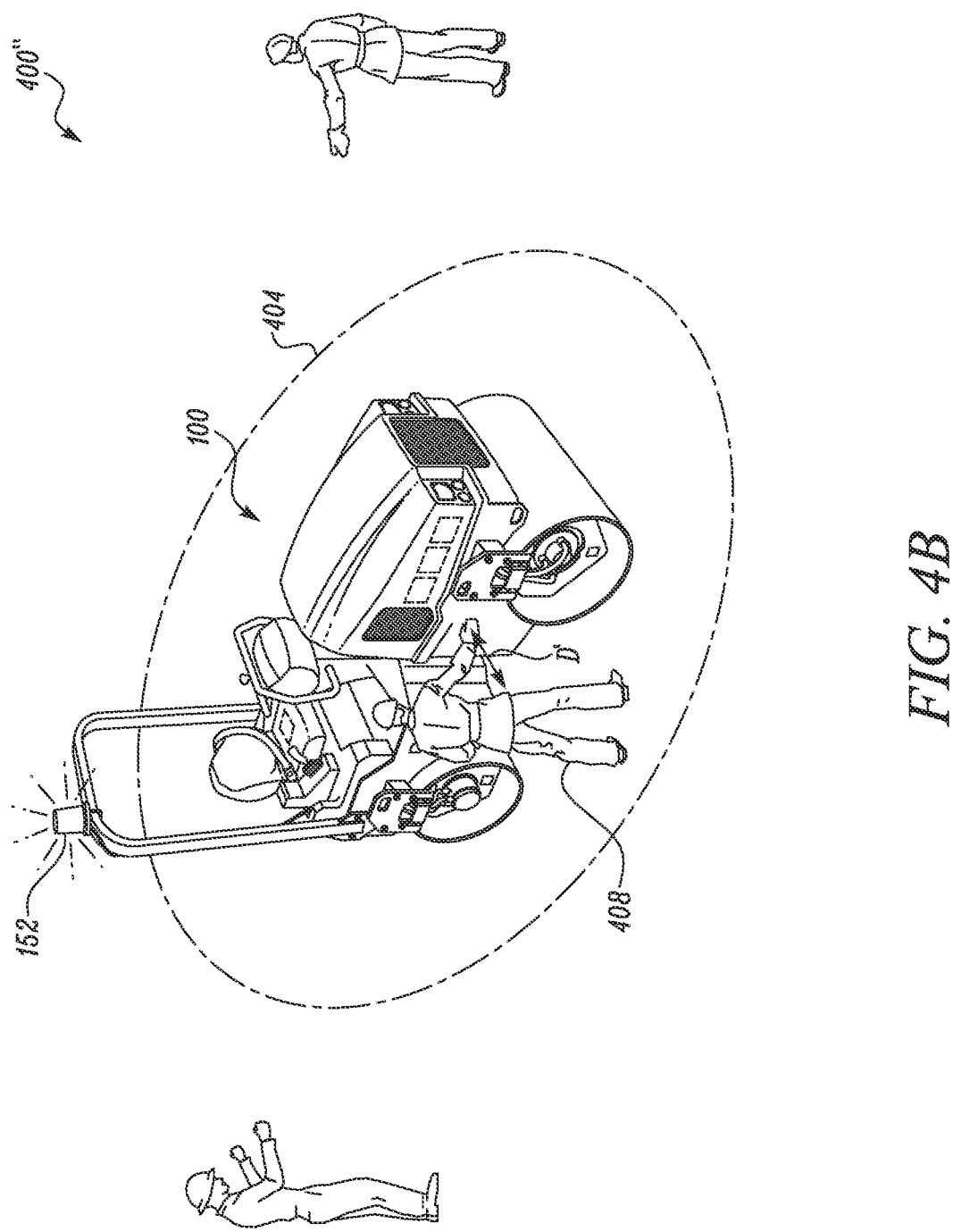

In accordance with various embodiments, the predefined distance range corresponds to a distance range from the machine 100 within which presence of any other entity is considered unsafe. For example, as shown in FIGS. 4A and 4B, the distance range 404 in the worksite 400', 400" may correspond to the predefined distance range within which the presence of entity (e.g., personnel 408) is considered unsafe. To this end, when the proximity D' of the machine 100 to the entity 408 is within the predefined distance range 404 (as shown in FIG. 4B), the proximity detection controller 234 is configured to generate the first signal. Further, when the proximity D of the machine 100 to the entity 408 is outside the predefined distance range 404 (as shown in FIG. 4A), the proximity detection controller 234 is configured to generate the second signal. The proximity detection controller 234 is further configured to transmit the signal (for example, the first signal or the second signal) to the processing unit 202 of the machine 100.

FIG. 2 illustrates a system 200 for operating the indicator 152, such as the beacon light in the machine 100. The power source system 204, the seating system 206, the seat belt locking system 208, the light system 210, the implement system 212, the machine speed sensing system 214, the location detection system 216, and the proximity detection system 218 may be configured to establish a datalink communication with the processing unit 202 over an on-board datalink communication channel of the machine 100.

The processing unit 202 may include a processor 236 configured to receive signals (e.g., the first signal or the second signal) from one or more of the power source system 204, the seating system 206, the seat belt locking system 208, the light system 210, the implement system 212, the machine speed sensing system 214, the location detection system 216, and the proximity detection system 218. In some embodiments, the processor 236 may be coupled directly with one or more of the power source 156, the operator seat 110, the seat belt assembly 158, the light source 128, the one or more implements 130, 132, the one or more sensors 142, the sensor 118, and the sensors 144 and is configured to generate the first signal or the second signal. In such cases, the processor 236 is configured to include the functionality of the one or more of the power source controller 220, the seating controller 222, the seat belt controller 224, the light controller 226, the implement controller 228, the machine speed sensing controller 230, the location detection controller 232, and the proximity detection controller 234.

The processor 236 is further coupled to the indicator 152 and is configured to operate the indicator 152 based on the first signal or the second signal. In accordance with various embodiments, the processor 236 is configured to activate the indicator 152 upon receiving the first signal and deactivate the indicator 152 upon receiving the second signal indicative of the non-operational state of the machine 100. In some embodiments, the processor 236 is configured to activate or deactivate the indicator 152 via a relay, a timer, or other electromechanical device.

In accordance with various embodiments, the first signal is indicative of the operational state of the machine 100 and corresponds to one or more machine parameters in the operational state of the machine. Further, the second signal is indicative of the non-operational state of the machine 100 and corresponds to one or more machine parameters in the non-operational state of the machine 100.

The operational state of the machine 100 may represent that the machine 100 is functioning and the non-operational may represent that the machine 100 is not functioning. As an example, when the running state of the power source 156 corresponds to the predefined running state, it would correspond to the operational state and when the running state of the power source 156 deviates from the predefined running state, it would correspond to the non-operational state. The one or more machine parameters may include one or more of the state of the power source 156, the state of the operator seat 110, the state of the seat belt 120 of the seat belt assembly 158, the state of the implement 130, the state of the motion of the machine 100, the state of the light source 128, the location of the machine 100, and the proximity of the machine to the object other than the machine 100. As an example, when the one or more machine parameters correspond to the location of the machine 100, the condition where the location of the machine 100 falls within the predefined location range corresponds to the operational state of the machine 100. In such cases, the processing unit 202 is configured to activate the indicator 152, as shown in FIG. 3B. Further, the condition where the location of the machine 100 falls outside the predefined location range corresponds to the non-operational state of the machine 100. In such cases, the processing unit 202 is configured to deactivate the indicator 152, as shown in FIG. 3A.

Similarly, when the one or more machine parameters correspond to the proximity of the entity from the machine 100, the condition where the proximity falls within the predefined distance range corresponds to the operational state of the machine 100. In such cases, the processing unit 202 is configured to activate the indicator 152, as shown in FIG. 4B. Further, the condition where the proximity falls outside the predefined distance range corresponds to the non-operational state of the machine 100. In such cases, the processing unit 202 is configured to deactivate the indicator 152, as shown in FIG. 4A. In some embodiments, the one or more machine parameters and the predefined values (e.g., predefined running state, predefined speed value, and the like) associated with the one or more machine parameters are configurable based on the preferences of the operator of the machine 100.

In some embodiments, the processing unit 202 is configured to deactivate the indicator 152 after a lapse of a predefined period pursuant to a receipt of the second signal. The predefined period may be configurable based on the preferences of the operator of the machine 100.

INDUSTRIAL APPLICABILITY

In accordance with various embodiments, a method for operating the indicator 152 of the machine 100 includes activating, by the processing unit 202, the indicator 152 based on the first signal to indicate the operational state of the machine 100. In some embodiments, the method further includes deactivating, by the processing unit 202, the indicator 152 based on the second signal to indicate the non-operational state of the machine 100.

The controllers 220, 222, 224, 226, 228, 230, 232, 234, and the processor 236 may be one or more processors, a microprocessor, a microcontroller, an electronic control module (ECM), an electronic control unit (ECU), or any other suitable means for monitoring the state of the power source. The power source controller may be implemented using one or more controller technologies, such as Application Specific Integrated Circuit (ASIC), Reduced Instruction Set Computing (RISC) technology, Complex Instruction Set Computing (CISC) technology or any other similar technology now known or developed in the future.

The present disclosure provides a method and system to automatically control the activation or deactivation of the beacon lights based on the operational state of the machine. This reduces the load or burden on the operator to manually activate or deactivate the beacon light every time he gets on the machine. Moreover, the one or more machine parameters and the predefined values associated with the one or more machine parameters indicating the operational state of the machine (100) or the processing unit 202 may be configurable, thereby providing additional flexibility to a user (such as, an operator) to control the activation or deactivation of the beacon lights (152). Further, the deactivation of the indicator 152 after a lapse of the predefined period pursuant to a receipt of the second signal, would provide sufficient time to one or more of the machines or personnel nearby to move away from the machine (100).

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A method for operating a beacon light of a machine, the method comprising:
   activating, by a processing unit, the beacon light based on a first signal to indicate an operational state of the machine, wherein the first signal corresponds to one or more machine parameters in the operational state of the machine; and
   deactivating, by the processing unit, the beacon light based on a second signal to indicate a non-operational state of the machine, wherein the second signal corresponds to the one or more machine parameters in the non-operational state of the machine,
wherein the processing unit deactivates the beacon light after a lapse of a predefined period pursuant to a receipt of the second signal by the processing unit.

2. The method of claim 1, wherein the one or more machine parameters correspond to a state of a power source of the machine, the method further comprising:
determining, by a power system, a running state of the power source of the machine;
generating, by the power system, the first signal when the running state of the power source of the machine corresponds to a predefined running state; and
generating, by the power system, the second signal when the running state of the power source of the machine deviates from the predefined running state.

3. The method of claim 1, wherein the one or more machine parameters correspond to a state of an operator seat of the machine, the method further comprising:
detecting, by a seating system, a pressure exerted on the operator seat of the machine;
generating, by the seating system, the first signal when the pressure exerted on the operator seat of the machine is greater than or equal to a predefined pressure value; and
generating, by the seating system, the second signal when the pressure exerted on the operator seat of the machine is less than the predefined pressure value.

4. The method of claim 1, wherein the one or more machine parameters correspond to a state of a seat belt associated with a seat of the machine, the method further comprising:
detecting, by a seat belt locking system, the state of the seat belt associated with the seat of the machine;
generating, by the seat belt locking system, the first signal when the state of the seat belt associated with the seat of the machine corresponds to a locked state; and
generating, by the seat belt locking system, the second signal when the state of the seat belt associated with the seat of the machine corresponds to an unlocked state.

5. The method of claim 1, wherein the one or more machine parameters correspond to a state of an implement of the machine, the method further comprising:
detecting, by an implement system, the state of the implement of the machine;
generating, by the implement system, the first signal when the state of the implement of the machine corresponds to a predefined implement state; and
generating, by the implement system, the second signal when the state of the implement of the machine deviates from the predefined implement state.

6. The method of claim 1, wherein the one or more machine parameters correspond to a state of motion of the machine, the method further comprising:
detecting, by a machine speed sensing system, the state of motion of the machine;
generating, by the machine speed sensing system, the first signal when the state of the motion of the machine is greater than or equal to a predefined speed value; and
generating, by the machine speed sensing system, the second signal when the state of the motion of the machine is less than the predefined speed value.

7. The method of claim 1, wherein the one or more machine parameters correspond to a state of one or more light sources installed on the machine, the method further comprising:
detecting, by a light system, the state of the one or more light sources installed on the machine;
generating, by the light system, the first signal when the state of the one or more light sources installed on the machine corresponds to an active state of the one or more light sources; and
generating, by the light system, the second signal when the state of the one or more light sources installed on the machine corresponds to an inactive state of the one or more light sources.

8. The method of claim 1, wherein the one or more machine parameters correspond to a location of the machine, the method further comprising:
detecting, by a location detection system, the location of the machine;
generating, by the location detection system, the first signal when the location of the machine falls with a predefined location range; and
generating, by the location detection system, the second signal when the location of the machine falls outside the predefined location range.

9. The method of claim 1, wherein the one or more machine parameters correspond to proximity of the machine to an object other than the machine, the method further comprising:
detecting, by a proximity detection system, the proximity of the machine to the object;
generating, by the proximity detection system, the first signal when the proximity of the machine to the object falls within a predefined distance range; and
generating, by the proximity detection system, the second signal when the proximity of the machine to the object falls outside the predefined distance range.

10. A machine, comprising:
a beacon light; and
a system for operating the beacon light, wherein the system includes:
a processing unit configured to activate the beacon light based on a first signal to indicate an operational state of the machine, wherein the first signal corresponds to one or more machine parameters in the operational state of the machine; and
deactivate the beacon light based on a second signal to indicate a non-operational state of the machine, wherein the second signal corresponds to the one or more machine parameters in the non-operational state of the machine,
wherein the processing unit is configured to deactivate the beacon light after a lapse of a predefined period pursuant to a receipt of the second signal by the processing unit.

11. The machine of claim 10, wherein the one or more machine parameters correspond to a state of a power source of the machine, the system further comprising:
a power system configured to:
determine a running state of the power source of the machine;
generate the first signal when the running state of the power source of the machine corresponds to a predefined running state; and
generate the second signal when the running state of the power source of the machine deviates from the predefined running state.

12. The machine of claim 10, wherein the one or more machine parameters correspond to a state of an operator seat of the machine, the system further comprising:
a seating system configured to:
detect a pressure exerted on the operator seat of the machine; generate the first signal when the pressure exerted on the operator seat of the machine is greater than or equal to a predefined pressure value; and generate the second signal when the pressure exerted on the operator seat of the machine is less than the predefined pressure value.

13. The machine of claim 10, wherein the one or more machine parameters correspond to a state of a seat belt associated with a seat of the machine, the system further comprising:
   a seat belt locking system configured to:
   detect the state of the seat belt associated with the seat of the machine;
   generate the first signal when the state of the seat belt associated with the seat of the machine corresponds to a locked state; and
   generate the second signal when the state of the seat belt associated with the seat of the machine corresponds to an unlocked state.

14. The machine of claim 10, wherein the one or more machine parameters correspond to a state of an implement of the machine, the system further comprising:
   an implement system configured to:
   detect the state of the implement of the machine;
   generate the first signal when the state of the implement of the machine corresponds to a predefined implement state; and
   generate the second signal when the state of the implement of the machine deviates from the predefined implement state.

15. The machine of claim 10, wherein the one or more machine parameters correspond to a state of motion of the machine, the system further comprising:
   a machine speed sensing system configured to:
   detect the state of motion of the machine;
   generate the first signal when the state of the motion of the machine is greater than or equal to a predefined speed value; and
   generate the second signal when the state of the motion of the machine is less than the predefined speed value.

16. The machine of claim 10, wherein the one or more machine parameters correspond to a state of one or more light sources installed on the machine, the system further comprising:
   a light system configured to:
   detect the state of the one or more light sources installed on the machine;
   generate the first signal when the state of the one or more light sources installed on the machine corresponds to an active state of the one or more light source; and
   generate the second signal when the state of the one or more light sources installed on the machine corresponds to an inactive state of the one or more light source.

17. The machine of claim 10, wherein the one or more machine parameters correspond to a location of the machine, the system further comprising:
   a location detection system configured to:
   detect the location of the machine; generate the first signal when the location of the machine falls with a predefined location range; and
   generate the second signal when the location of the machine falls outside the predefined location range.

18. The machine of claim 10, wherein the one or more machine parameters correspond to proximity of the machine to an object other than the machine, the system further comprising:
   a proximity detection system configured to:
   detect the proximity of the machine to the object; generate the first signal when the proximity of the machine to the object falls within a predefined distance range; and
   generate the second signal when the proximity of the machine to the object falls outside the predefined distance range.

* * * * *